J. S. LUCAS.
HAND-CULTIVATOR.
No. 182,374. Patented Sept. 19, 1876.
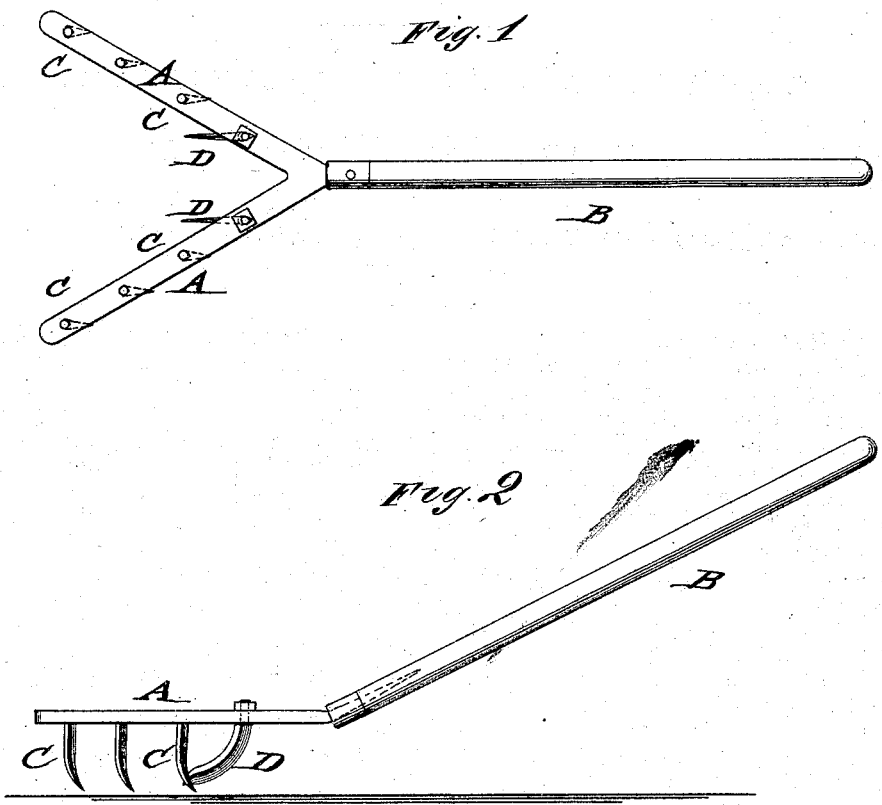
WITNESSES:
A. W. Almqvist
John Goethals
INVENTOR:
J. S. Lucas
BY
ATTORNEYS.

UNITED STATES PATENT OFFICE.

JAMES S. LUCAS, OF BOWLING GREEN, KENTUCKY.

IMPROVEMENT IN HAND-CULTIVATORS.

Specification forming part of Letters Patent No. 182,374, dated September 19, 1876; application filed July 11, 1876.

*To all whom it may concern:*

Be it known that I, JAMES S. LUCAS, of Bowling Green, in the county of Warren and State of Kentucky, have invented a new and Improved Hand-Cultivator, of which the following is a specification:

In the accompanying drawing, Figure 1 represents a top view, and Fig. 2 a side view, of my improved hand-cultivator.

Similar letters of reference indicate corresponding parts.

My invention relates to an improved hand-cultivator for field and garden use, that may be worked with advantage for nearly all kinds of vegetables, by pulling astride the row, and also for pruning strawberry and other vines.

The invention consists of a hand-cultivator with V-shaped arms or wings, having a suitable number of teeth and curved cutting-knives at the front part.

In the drawing, A represents the wings or arms of my improved cultivator, which are arranged in V shape, spreading at a suitable angle, and attached to an inclined handle, B. The wings A are provided with cultivator-teeth C, which are either made in one piece with the wings, or riveted or screwed thereto. The teeth may be made round, square, or triangular, straight or curved, and of suitable length.

At the front part of the wings A, near the apex or meeting-point of the same, are placed curved knives D, having the edge on the convex side, that serve for the purposes of forming or cutting strawberry and other vines, weeds, &c., that would otherwise hamper and obstruct the cultivator.

The hand-cultivator is readily used between the rows of vegetables, and admit the passing across the rows with facility on account of the angle of the wings to the handle. The cultivator forms thus a convenient implement for field and garden use, and serves to rake the ground and cut the weeds in an effective manner.

Having thus described my invention, I claim as new and desire to secure by Letters Patent—

The combination of the spreading wings A, cultivator-teeth C, cutting or pruning knives D, and handle B, all constructed and relatively arranged as herein shown, for the purpose set forth.

JAS. S. LUCAS.

Witnesses:
ETHEL WILLIAMS,
W. H. ROCHESTER.